United States Patent Office 3,426,064
Patented Feb. 4, 1969

---

3,426,064
PREPARATION OF ALPHA-NAPHTHYL ALKYL-CARBAMATES
Jean Lehureau, Saint-Rambert-l'Ile-Barbe, and François Pierrot, Lyon, France, assignors to Progil, Societe Anonyme, Paris, France, a corporation of France
No Drawing. Continuation of application Ser. No. 271,452, Apr. 8, 1963. This application Dec. 9, 1966, Ser. No. 600,394
Claims priority, application France, Apr. 9, 1962, 893,765
U.S. Cl. 260—479                               2 Claims
Int. Cl. C07c 125/06

---

ABSTRACT OF THE DISCLOSURE

A process of manufacturing substantially pure α-naphthyl carbamate by treating a mixture containing α-naphthol and other naphthalene derivatives with an isocyanate, possibly in the presence of an organic solvent, and maintaining the reaction mixture at room temperature until a precipitate of the carbamate is formed.

---

This is a continuation of patent application Ser. No. 271,452, filed Apr. 8, 1963, now abandoned. This invention relates to a process for the manufacture of carbamates of alpha-naphthol and, more particularly, to a method for the production of alkyl-carbamates.

The alkyl carbamates of alpha-naphthol are of considerable value in industry because of their biological properties and particularly because of their insecticidal action. However, the preparation of very pure alpha-naphthol has presented technical problems which have not, as yet, been solved satisfactorily. For instance, certain prior art methods of producing alpha-naphthol leads to the formation of complex mixtures which contain, in addition to from 5% to 95% of alpha-naphthol, a complementary proportion of naphtholene and its derivatives, including dihydronaphthalene, tetrahydronaphthalene (tetraline), and oxy- and hydroxy-derivatives thereof, such as 5,6,7,8-tetrahydro 1-hydroxynaphthalene and 1-oxo 1,2,3,4-tetrahydronaphthalene (alpha-tetralone). This means that, in order to manufacture an alkyl carbamate of alpha-naphthol from such a starting material, the alpha-naphthol must first be separated from the complex mixture. Such a separation is very difficult and the cost may be prohibitive. These and other difficulties experienced with the prior art methods have been obviated in a novel manner by the present invention.

It is, therefore, an outstanding object of the invention to provide a process for the manufacture of carbamates of alpha-naphthol of high purity.

Another object of this invention is the provision of a method for relatively inexpensively producing substantially pure alpha-napthyl alkyl carbamates.

A further object of the present invention is the provision of a process for manufacturing various alkyl carbamates of alpha-napthol in a simple and economical manner from complex mixtures.

It is another object of the instant invention to provide a carbamate of a desired purity from a very impure alpha-naphthol.

It is a further object of the invention to provide a method in which carbamates are readily obtained from starting materials of low alpha-naphthol content, the yield of the method approaching 100% calculated on the basis of the alpha-naphthol present in the mixture treated.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principles of the invention may be employed.

In a general way, the process of the invention consists in treating a mixture of alpha-naphthol with an alkyl-isocyanate having 1 to 6 carbon atoms in the alkyl group, the mixture containing other naphthalene derivatives. This process transforms the alpha-naphthol present into the corresponding alpha-naphthol alkyl carbamate in substantially pure form. This carbamate is then separated from the reaction medium by crystallization. Preferably, the treatment with the isocyanate is carried out in an appropriate solvent in which the naphthalenic compounds accompanying the alpha-naphthol are soluble. If the crystallization does not occur spontaneously, it is desirable to concentrate the carbamate solution obtained after the chemical reaction by distillation. The crystallization is then carried out in a new solution of the solvent.

This last variation of the process, i.e., concentration by distillation is especially useful when the starting mixture contains relatively small amounts of alpha-napthol, for example, less than 30% by weight. The concentration by elimination of the solvent and of part of the other naphthalenic compounds by distillation should be carried out directly after the chemical formation of the carbamate.

If, however, the initial mixture is quite rich in naphthol and only one crystallization of the carbamate takes place during or after the chemical reaction, it is then desirable subsequently to concentrate the mother liquor from the crystallization, in order to extract a supplementary fraction of carbamate crystals. It may also be advantageous to repeat the concentration, the addition of more solvent, and further crystallization several times.

If the initial mixture contains sufficient amounts of certain compounds with low freezing points (for example, tertahydronaphthalene), the process can be carried out without the presence of a solvent. Otherwise, it is preferable to use one or more solvents, care being taken to choose solvents which do not react chemically with the compounds present. One may use various hydrocarbons and/or their halogenated derivatives or ketones; such useable liquids include carbon tetrachloride, dichloroethane, trichloroethylene, perchloroethylene, chlorobenzene, acetone, methyl ethyl ketone, cyclohexanone, benzene, toluene, xylene, naphtha solvent, hexane, or petroleum.

A perferred method of carrying out the process consists of reacting, at room temperature, one or more selected alkyl isocyanates with a mixture containing the alpha-naphthol, the reaction taking place for a sufficient length of time to bring about a transformation into the corresponding naphthyl carbamate. The length of time may vary with the temperature of the solution, with the concentration of the solution, and with the nature of the isocyanate; however, it is generally in the order of 6 to 40 hours and usually around 24 hours.

It is advantageous to use a slight excess of the isocyanate with respect to the stoichiometric quantity corresponding to the proportion of alpha-naphthol in the solution, for example, it would be desirable to use 1.05 to 1.2 moles of isocyanate per mole of alpha-naphthol.

Depending on the nature of the solvent and the concentration of the carbamate in the solution, it may be desirable to lower the temperature of the solution in order to initiate the crystallization.

If the starting solution contains appreciable amounts of alpha-tetralone in addition to the alpha-naphthol, this cyclic ketone can be isolated by distillation after the crystallization of the alpha-naphthyl carbamate or, at least, a major part thereof. The process according to the invention is, therefore, also a process for the separation of the tetralone from mixtures thereof with other naphthalenic compounds.

In order to illustrate the invention, some non-limiting examples are given. In these examples, preparations are described which make use of methyl isocyanate and n-butyl isocyanate, but the process could also be carried out with other alkyl isocyanates, especially the ethyl, propyl, isopropyl, isobutyl, pentyls, or hexyls.

EXAMPLE I

The mixture to be treated consisted of 44.6% of alpha-naphthol and 55.4% of alpha-tetralone by weight. 940 grams of this mixture were diluted in 2.5 litres of carbon tetra-chloride. Then, 180 grams of methyl isocyanate were added to the solution, i.e., 3.15 moles of $CH_3NCO$ per 2.91 moles of $C_{10}H_7OH$. This represented about 8% stoichiometric excess of isocyanate. The process was carried out at ambient temperature (15° to 25° C.) and the solution was left at this temperature for 24 hours. At the end of this period a precipitate had formed of alpha-naphthyl methyl carbamate, $CH_3$—NH—COO—$C_{10}H_7$. This was separated by filtration, washed with a small amount of hexane, and then dried. A first yield of alpha-naphthyl methyl carbamate was thus obtained, the yield consisting of 490 grams (2.44 moles) of colorless crystals having a melting point of 142° C.; the yield with respect to the alpha-naphthol consumed was 83.6%.

The mother liquor from the crystallization was then submitted to fractional distillation; first, the solvents used were recovered and, then, 340 grams of alpha-tetralone, this representing 65.5% of the initial quantity of this compound. The tetralone recovered boiled at 96° C. under a pressure of 0.5 mm. Hg. To the residual liquid from this distillation, 500 cc. of carbon tetrachloride were added and the resultant solution was allowed to crystallize. In this way, a second yield was obtained of alpha-naphthyl methyl carbamate, having a melting point of 142° C.; this second yield represented 10.2% with respect to the original alpha-naphthol used. After filtration to separate the crystals and further distillation, the residue liquor was mixed with one litre of hexane and a third yield was obtained of alpha-naphthyl methyl carbamate in the form of 30 grams of impure crystals having a melting point of 130° C., corresponding to a yield of 5.1%. The total carbamate yield from these operations amounted to about 98.9% with respect to the alpha-naphthol used.

EXAMPLE II

The same procedure as in Example I was used and 1000 grams were used of a mixture containing the following substances:

|  | Percent |
|---|---|
| Alpha-naphthol (2.93 moles) | 42.25 |
| Tetralene | 0.18 |
| Dihydronaphthalene | 0.35 |
| Naphthalene | 0.40 |
| Tetrahydro alpha-naphthol | 2.75 |
| Alpha-tetralone | 52.25 |
| Colorless impurities | 1.82 |

The following yields of alpha-naphthyl methyl carbamate were obtained successively:

|  | Melting point (° C.) | Yield, percent |
|---|---|---|
| 1st yield, 480 grams colorless crystals | 141.5 | 81.5 |
| 2nd yield, 60 grams crystals slightly less colorless | 141 | 10.2 |
| 3rd yield, 40 grams yellow crystals | 132/133 | 6.8 |

The total yield was about 98.5% and about 75% of the tetralone used was recovered.

EXAMPLE III

The procedure described in Examples I and II was used and 100 grams of the following composition was treated:

|  | Percent |
|---|---|
| Alpha-naphthol | 76.2 |
| Alpha-tetralone | 23.8 |

The process used 33 grams of methyl isocyanate and the following successive yields were obtained:

|  | Melting point (° C.) | Yield, percent |
|---|---|---|
| 1st yield, 99.4 grams of colorless crystals | 142 | 93.4 |
| 2nd yield, 5.8 grams of colorless crystals | 142 | 5.45 |

The total yield of alpha-naphthyl methyl carbamate was 98.5%.

EXAMPLE IV 1000 grams of the same mixture as described in connection with Example II was used and the process was the same, with the exception that 310 grams was used of n-butyl isocyanate. The following successive yields of alpha-naphthyl n-butyl carbamate were obtained:

|  | Melting point (° C.) | Yield, percent |
|---|---|---|
| 1st yield, 564 grams of colorless crystals | 72.5 | 79.3 |
| 2nd yield, 96 grams of colorless crystals | 72 | 13.5 |
| 3rd yield, 29 grams of slightly yellow crystals | 67/69 | 4.1 |

The total yield was 96.9% and 86% of the tetralone used was recovered.

It can be seen, then, that the practice of the present invention results in the production of carbamates of alpha-naphthol having a high purity and this can be accomplished inexpensively by use of very simple procedures. The starting materials can be quite complex and can, in addition, contain substances such as naphthalene derivatives that would make the use of prior art procedures impractical. Furthermore, the starting mixture can contain relatively small amounts of alpha-naphthol and still give close to 100% yield.

Other modes of applying the principles of the invention may be employed, change being made with regard to the details described, provided the features stated in the following claims or the equivalent of such, be employed.

The invention having been thus described, what is claimed as new and desired to secure by Letters Patent is:

1. A process for the manufacture of a substantially pure alpha-naphthyl alkyl-carbamate from a mixture consisting of alpha-naphthol, naphthalene, dihydronaphthalene, tetrahydronaphthalene, alpha-tetralone, and tetrahydro-alpha-naphthol which comprises: introducing into the mixture an alkyl isocyanate having 1 to 6 carbon atoms in the alkyl group, in an amount slightly in excess of a stoichiometric amount with respect to the alpha-naphthol present in said mixture; maintaining the resulting solution at ambient temperature for a period of time in the range from 6 to 40 hours until a precipitate of the carbamate is formed; and separating the crystals of the carbamate from the mother liquor.

2. A process as recited in claim 1, wherein the mixture is carried in carbon tetrachloride as a solvent.

(References on following page)

References Cited

UNITED STATES PATENTS

| | | | |
|---|---|---|---|
| 2,776,197 | 1/1957 | Gysin et al. | 260—479 |
| 2,824,123 | 2/1958 | Kuceski. | |
| 3,084,096 | 4/1963 | Lambrech | 260—479 |
| 3,084,182 | 4/1963 | McElroy | 260—479 |

OTHER REFERENCES

Goftman et al.: Chemical Abstracts, vol. 52, pp. 19089e–19090c (1958).

J. A. PATTEN, *Primary Examiner.*

M. G. BERGER, *Assistant Examiner.*